(12) United States Patent
Senner

(10) Patent No.: US 7,082,644 B2
(45) Date of Patent: Aug. 1, 2006

(54) HANDLE EXTENSION FOR ROTATING A CRANK HANDLE

(76) Inventor: Victor Senner, 10515-62 Street, Edmonton, Alberta (CA) T6A 2M2

( * ) Notice: Subject to any disclaimer, the term of this patent is extended or adjusted under 35 U.S.C. 154(b) by 0 days.

(21) Appl. No.: 10/346,889

(22) Filed: Jan. 15, 2003

(65) Prior Publication Data

US 2004/0025300 A1 Feb. 12, 2004

(30) Foreign Application Priority Data

Aug. 8, 2002 (CA) .................................. 2397225

(51) Int. Cl.
*B26M 3/14* (2006.01)
*E05B 1/00* (2006.01)

(52) U.S. Cl. .......................................... 16/427; 16/429
(58) Field of Classification Search .......... 16/421–422, 16/425–427, 429; 74/543–546; 49/460
See application file for complete search history.

(56) References Cited

U.S. PATENT DOCUMENTS

| | | | | |
|---|---|---|---|---|
| 1,503,963 A | * | 8/1924 | Nilsson | 123/185.13 |
| 3,706,254 A | * | 12/1972 | Morin | 84/458 |
| 3,949,817 A | * | 4/1976 | Rice | 16/427 |
| 4,266,320 A | * | 5/1981 | Grant | 16/427 |
| 4,419,556 A | * | 12/1983 | Hare | 16/427 |
| 4,707,921 A | * | 11/1987 | Meyer et al. | 16/427 |
| 4,984,489 A | * | 1/1991 | Krauthamer | 81/124.2 |
| 5,070,576 A | * | 12/1991 | Banta | 16/427 |
| 5,272,953 A | * | 12/1993 | Koch | 84/458 |
| 5,319,829 A | * | 6/1994 | Manuel | 16/427 |
| 5,421,060 A | * | 6/1995 | Miller et al. | 16/427 |
| 5,507,204 A | * | 4/1996 | Diffrient | 16/429 |
| 5,711,511 A | * | 1/1998 | Cynar | 16/427 |
| 5,713,614 A | * | 2/1998 | Anderson | 16/427 |
| 6,186,475 B1 | * | 2/2001 | Selepouchin | 16/427 |
| 6,294,719 B1 | * | 9/2001 | Palecki et al. | 84/458 |
| 6,457,208 B1 | * | 10/2002 | Keith | 16/427 |
| 6,901,825 B1 | * | 6/2005 | Lebron | 81/124.2 |

* cited by examiner

*Primary Examiner*—Brian E. Glessner
*Assistant Examiner*—Christopher Boswell
(74) *Attorney, Agent, or Firm*—Christensen O'Connor Johnson Kindness PLLC

(57) ABSTRACT

A handle extension for rotating a crank handle includes an elongate shaft having a first end and a second end. A member with a receptacle for engaging the crank handle is mounted at the first end of the shaft. When the second end of the shaft is grasped and a rotational force imparted to the shaft, the crank handle is caused to rotate. This handle extension is useful with crank handle operated ceiling mounted ventilation openings commonly found in recreational vehicles.

3 Claims, 2 Drawing Sheets

HANDLE EXTENSION FOR ROTATING A CRANK HANDLE

FIELD OF THE INVENTION

The present invention relates to handle extension for rotating a crank handle

BACKGROUND OF THE INVENTION

It is common for recreational vehicles to have ceiling mounted ventilation openings with pivotally mounted roof closures. The closures are moved from a closed position to an open position by means of a ceiling mounted crank handle. The roof closures are kept in the closed position when the recreational vehicle is in motion in order to avoid being damaged by wind or by striking obstacles. When the recreational vehicle is at rest, the roof closures are moved to the open position by means of the ceiling mounted crank handle in order to allow fresh air into the recreational vehicle.

As the crank handle is ceiling mounted, a great number of recreational vehicle owners can only reach the crank handles by standing on a chair or a stool. Whenever a person must climb up onto a chair or a stool there is a potential danger of an accidental fall.

SUMMARY OF THE INVENTION

The present invention relates to a handle extension for rotating crank handles, which provides an alternative to standing on a chair or stool.

According to the present invention there is provided a handle extension for rotating a crank handle which includes an elongate shaft having a first end and a second end. Means for engaging the crank handle is mounted at the first end of the shaft. When the second end of the shaft is grasped and a rotational force imparted to the shaft, the crank handle is caused to rotate.

With the handle extension, as described above, persons who are not tall enough to reach the crank handle are able to engage and rotate the crank handle via the handle extension.

The preferred means for engaging the crank handle is a member positioned at the first end of the shaft which has a receptacle adapted to receive in close fitting relation the crank handle. It has been found that this receptacle works best when it is formed with two portions; a first portion adapted to receive a body portion of the crank handle and a second portion adapted to receive a bent gripping portion of the crank handle.

Although beneficial results may be obtained through the use of the handle extension, as described above, it is sometimes difficult to position the receptacle over the crank handle when reaching up from ground level. Even more beneficial results may, therefore be obtained when a slotted opening is provided into the second portion of the receptacle. This facilitates insertion of the bent gripping portion of the crank handle.

Although one may merely manipulate the second end of the shaft to rotate the crank, it is preferred that a hand grip be mounted on the second end of the shaft. This provides greater comfort to the use by preventing slippage which can cause blisters.

BRIEF DESCRIPTION OF THE DRAWINGS

These and other features of the invention will become more apparent from the following description in which reference is made to the appended drawings, the drawings are for the purpose of illustration only and are not intended to in any way limit the scope of the invention to the particular embodiment or embodiments shown, wherein.

DETAILED DESCRIPTION OF THE PREFERRED EMBODIMENT

Figure 1:
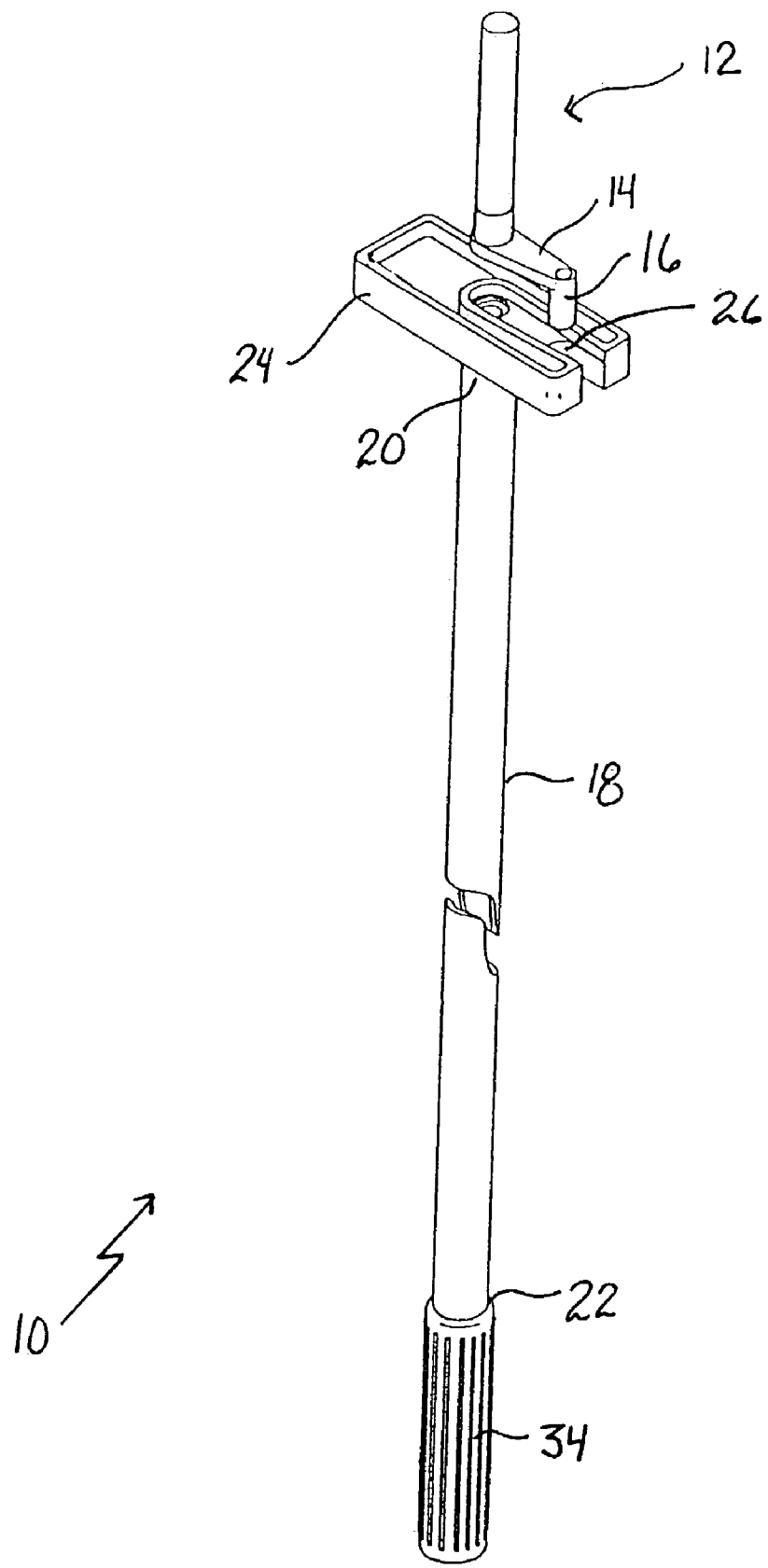
FIG. 1 is a perspective view of a handle extension for rotating a crank handle constructed in accordance with the teachings of the present invention

The preferred embodiment, a handle extension for rotating a crank handle generally identified by reference numeral 10, will now be described with reference to FIGS. 1 through 2.

Figure 2:
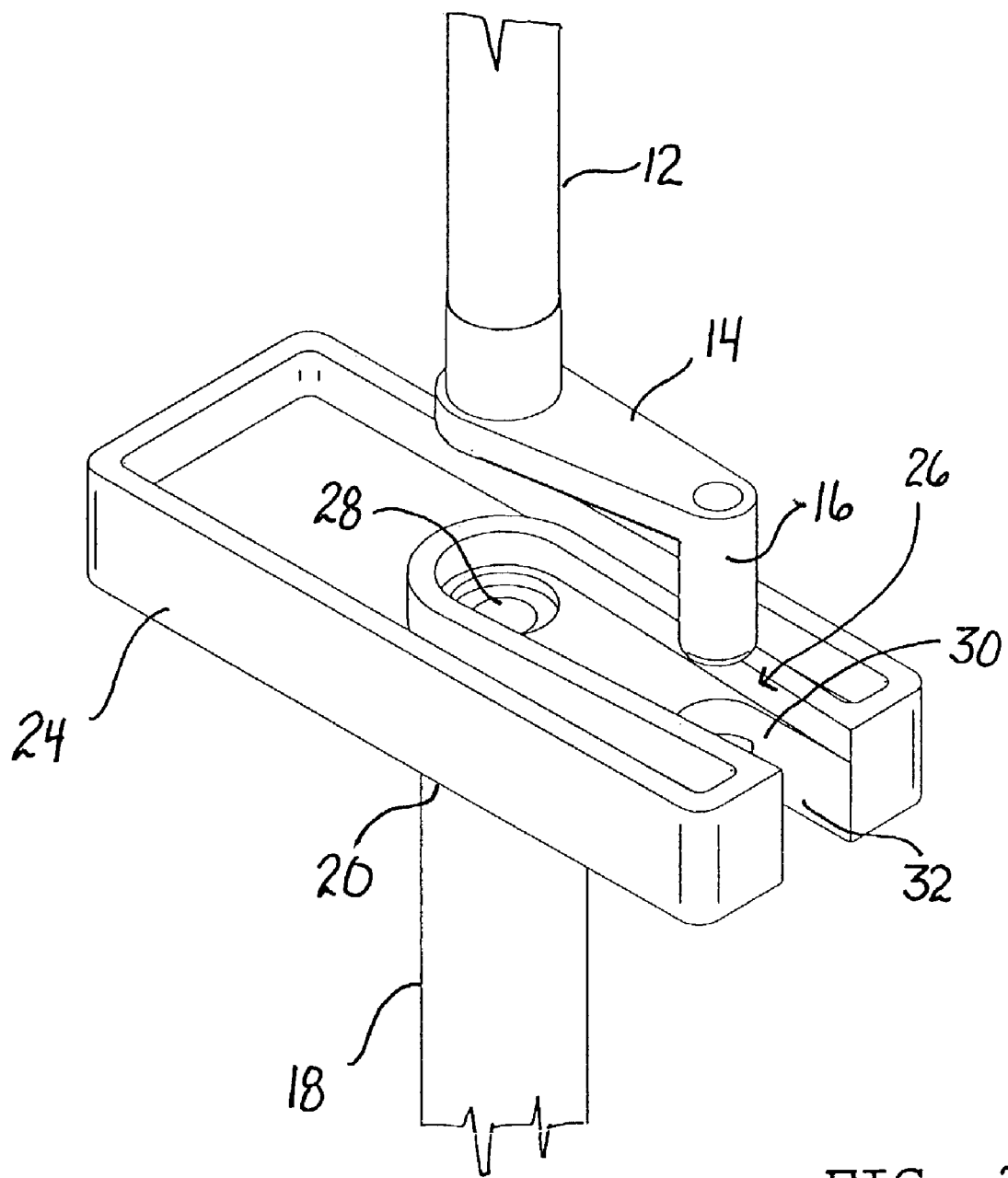
FIG. 2 is a detailed view of the member on the handle extension illustrated in FIG. 1

Structure and Relationship of Parts:

Referring to FIG. 1, there is illustrated a crank handle 12 which has a body portion 14 and a bent gripping portion 16.

Referring to FIG. 1, handle extension 10 includes an elongate shaft 18 having a first end 20 and a second end 22. A member 24 is positioned at first end 20 of shaft 18. Referring to FIG. 2, member 24 has a receptacle 26 that is adapted to receive in close fitting relation crank handle 12. Receptacle 26 has a first portion 28 that is adapted to receive body portion 14 of crank handle 12 and a second portion 30 that is adapted to receive bent gripping portion 16 of crank handle 12. A slotted opening 32 is provided into second portion 30 of receptacle 26, thereby facilitating insertion of bent gripping portion 16 of crank handle 12. Referring to FIG. 1, a hand grip 34 is mounted on second end 22 of shaft 18, such that grasping hand grip 34 and rotating shaft 18 causes crank handle 12 to rotate.

Operation:

The use and operation of handle extension for rotating a crank handle generally identified by reference numeral 10, will now be described with reference to FIGS. 1 through 2. Referring to FIG. 1, with the handle extension 10, as described above, persons who are not tall enough to reach crank handle 12 are able to engage and rotate crank handle 12 via handle extension 10. To do so, member 24 that is positioned at first end 20 of shaft 18 is positioned so that receptacle 26 is able to receive crank handle 12 in close fitting relation. When engaged with crank handle 12, first portion 28 of member 24 receives body portion 14 of crank handle 12 and second portion 30 receives bent gripping portion 16 of crank handle 12. As it is sometimes difficult to position receptacle 26 over crank handle 12 when reaching up from ground level, slotted opening 32 facilitates insertion of bent gripping portion 16 of crank handle 12. Hand grip 34 that is mounted on second end 22 of shaft 18 provides greater comfort to the use by preventing slippage which can cause blisters.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent to one skilled in the art that modifications may be made to the illustrated embodiment without departing from the spirit and scope of the invention as hereinafter defined in the claims.

The embodiments of the invention in which an exclusive property or privilege is claimed are defined as follows:

1. A handle extension for rotating a crank handle, the crank handle having a base portion with a rotational axis, a body portion that extends at an angle from the base portion, and a bent gripping portion that extends at an angle from the body portion and is axially offset from the rotational axis of the base portion, the handle extension comprising:

an elongate shaft having an axis, a first end and a second end;

a member fixedly secured in a transverse plane across the first end of the shaft, the member having a receptacle defined in the transverse plane to receive in close fitting relation the crank handle with the axis of the shaft in substantial axial alignment with the rotational axis of the crank handle, the receptacle having a first portion in the transverse plane adapted to receive the body portion of the crank handle and a second portion with a slotted opening defined perpendicular to the transverse plane, the slotted opening having a sidewall being defined axially offset from the rotational axis of the crank handle and adapted to receive in close fitting relation the bent gripping portion of the crank handle, thereby facilitating insertion of the bent gripping portion of the crank handle in the second portion of the receptacle; and a hand grip mounted on the second end of the shaft, such that grasping the hand grip and rotating the shaft about its axis causes the crank handle to rotate, wherein the sidewall of the slotted opening is configured to bear upon the bent gripping portion of the crank handle when a crank handle is received in the receptacle of the member and the elongate shaft is rotated.

2. A combination crank handle for a ceiling mounted ventilation opening and a handle extension for rotating the crank handle, comprising:

a crank handle configured for attachment to a ceiling mounted ventilation opening, the crank handle having a rotational axis, a body portion extending outward away from the rotational axis, and a bent gripping portion connected to the body portion axially offset from the rotational axis of the crank handle;

an elongate shaft having an axis, a first end and a second end; and a member fixedly secured in a transverse plane across the first end of the shaft, the member having a receptacle adapted to receive in close fitting relation the crank handle with the axis of the shaft in substantial axial alignment with the rotational axis of the crank handle, the receptacle having a first portion in the transverse plane adapted to receive the body portion of the crank handle and a second portion with a slotted opening defined perpendicular to the transverse plane, the slotted opening having a sidewall being defined axially offset from the rotational axis of the crank handle and adapted to receive in close fitting relation the bent gripping portion of the crank handle, such that grasping the second end and rotating the shaft about its axis causes the crank handle to rotate.

3. The combination crank handle and handle extension as defined in claim 2, wherein a hand grip is mounted on the second end of the shaft.

* * * * *